United States Patent Office 3,473,871
Patented Oct. 21, 1969

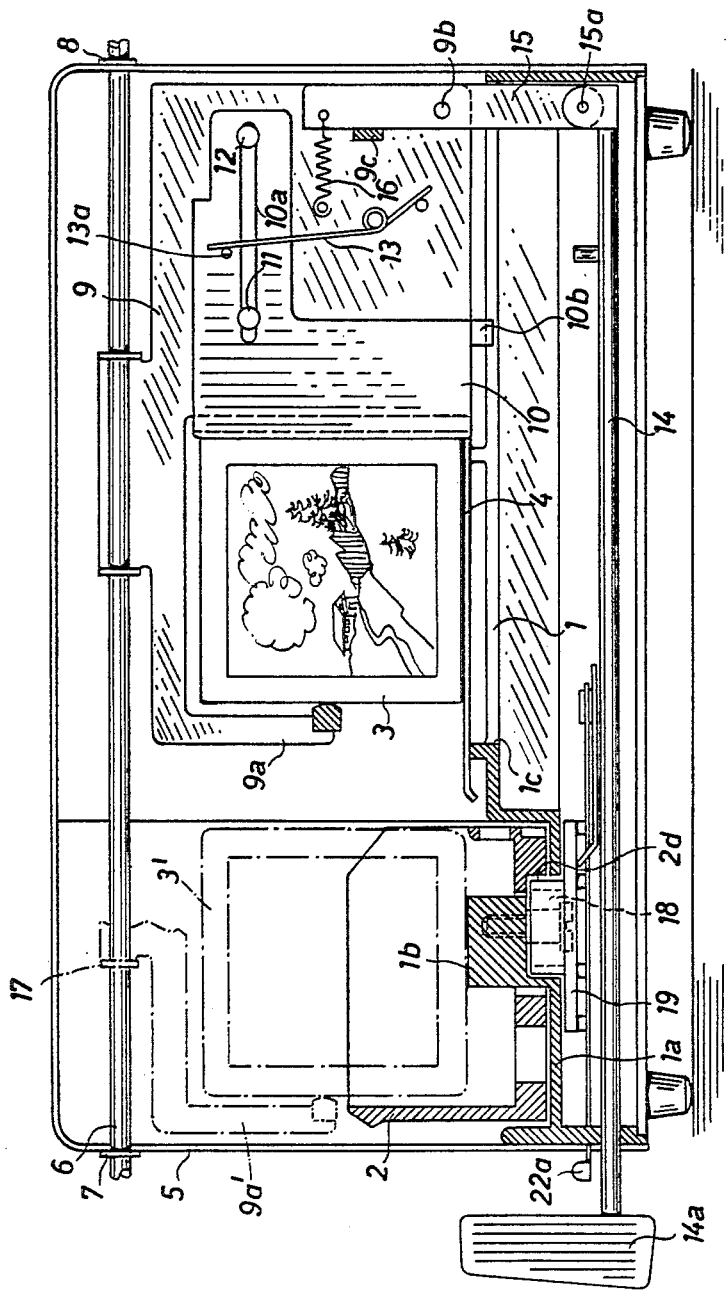

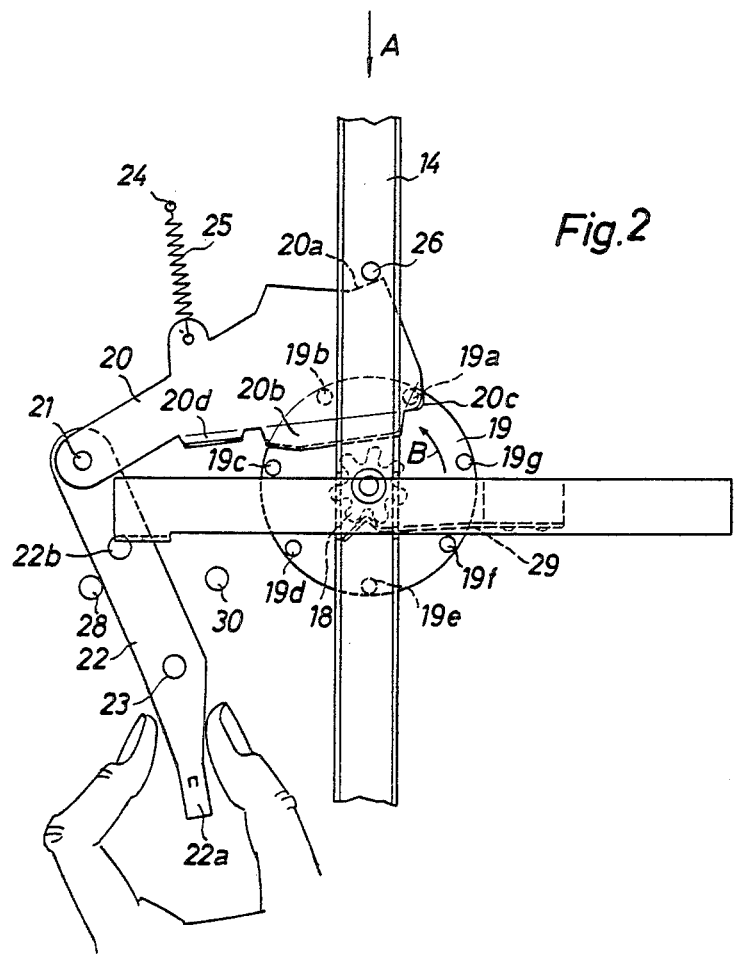

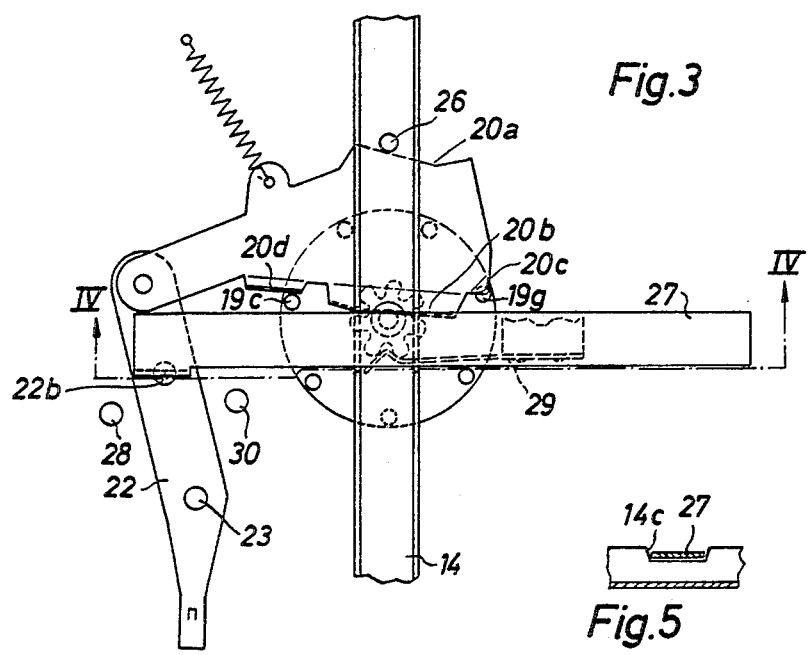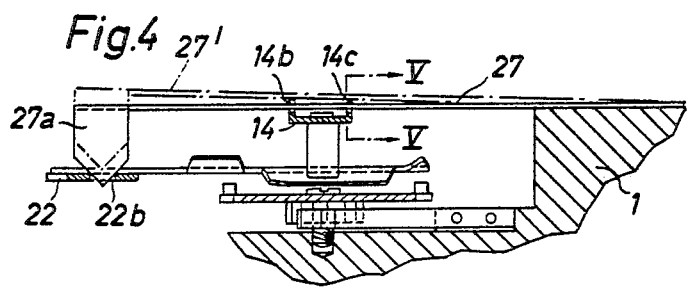

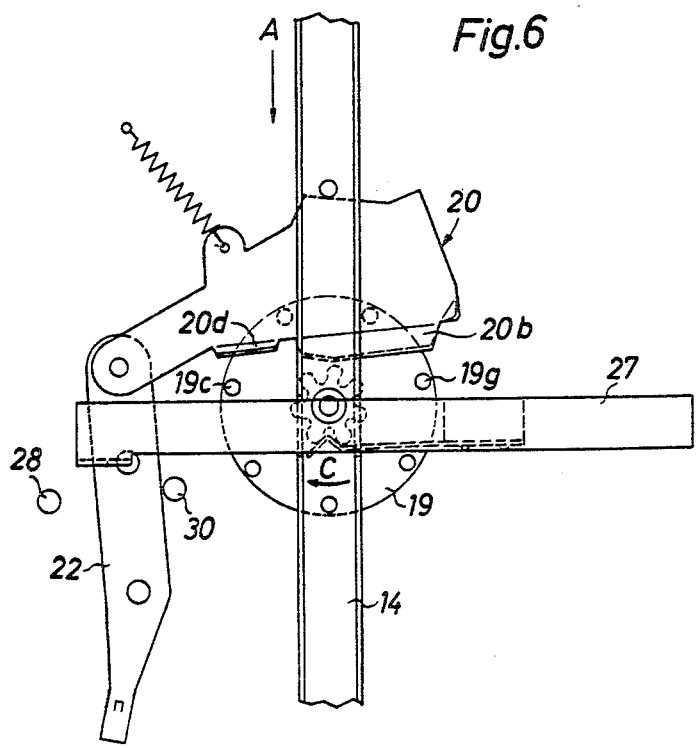

3,473,871
APPARATUS FOR MANIPULATING
DIAPOSITIVES
Wilfried Hofmann, Munich, Germany, assignor to Agfa-Gevaert Aktiengesellschaft, Leverkusen, Germany
Filed Oct. 6, 1966, Ser. No. 584,706
Claims priority, application Germany, Oct. 9, 1965,
A 24,520
Int. Cl. G03b 23/00; G09f 11/30
U.S. Cl. 353—116
11 Claims The present invention relates to apparatus for manipulating diapositives, commonly known as slide transparencies or slides. More particularly, the invention relates to improvements in apparatus for use with slide-containing magazines of the type having a rack or an analogous arrangement of teeth which may be engaged by a pinion to move the magazine with reference to a support in the apparatus. Still more particularly, the invention relates to improvements in a magazine transporting mechanism for use in slide viewers or slide projectors.

It is already known to provide a slide viewer or a slide projector with an indexing mechanism which can turn the pinion in response to operation of the slide changer whereby the pinion advances the magazine by a step to place the next slide into a position for transfer into the field of view. A serious drawback of such transporting mechanism is that they do not permit independent movement of the magazine forwardly or rearwardly so that the operator cannot select at will that slide which is to be viewed next. In such apparatus, the magazine can be inserted from one side only and withdrawn from the other side only because the transporting mechanism does not allow for withdrawal, independently of the slide changer, in a direction counter to that in which the magazine has been inserted into its channel.

Accordingly, it is an important object of the present invention to provide a slide manipulating apparatus for use with toothed slide magazines wherein the magazine transporting mechanism is constructed and assembled in such a way that it can be placed into a neutral or ineffective position in which the magazine can be moved by hand in either direction.

Another object of the invention is to provide a semiautomatic slide viewer or slide projector wherein the magazine transportating mechanism may be yieldably locked in ineffective position.

A further object of the invention is to provide a magazine transporting mechanism which can move the magazine forwards or backwards and which can be operated by the slide changer.

An additional object of the invention is to provide a novel indexing arrangement for use in a magazine transporting mechanism of the above outlined characteristics.

A concomitant object of the invention is to provide a very simple device which can select the direction of magazine travel and which can also place the magazine transporting mechanism into an ineffective position.

Briefly stated, my invention is embodied in a slide manipulating apparatus for use with slide magazines of the type having a set of teeth, for example, a straight toothed rack or a ring gear. The apparatus comprises a base plate or an analogous support for a magazine, a pinion rotably mounted in or on the support and adapted to mesh with the teeth of a magazine which has been properly placed onto or inserted into the support, an indexing member for the pinion, an annulus of equidistant projections on the indexing member, a pawl or an analogous turning member displaceable with reference to the support between first, second and third positions and having a portion (for example, one or more pallets) engageable with the projections only in the first and second positions of the turning member so that, when moved to third position, the turning member cannot interfere with manual displacement of the magazine along the support because the projections of the indexing member can bypass the pallet or pallets of the turning member, selector means for moving the turning member between its positions, and motion transmitting means for imparting to the turning member movements which, only in the first and second positions of the turning member, are transmitted to selected projections to thereby turn the indexing member through angles of predetermined magnitude whereby the pinion moves the magazine in stepwise fashion.

The motion transmitting means may be provided on a manually reciprocable push-pull slide changer and can engage a cam face on the turning member, at least when the slide changer approaches one of its end positions, namely, that end position in which a slide has been returned into the magazine and the latter is ready to advance by a step in response to continued movement of the slide changer and resultant rotation of the pinion.

In its first and second positions, the turning member respectively rotates the index member in a clockwise and counterclockwise direction.

The novel features which are considered as characteristic of the invention are set forth in particular in the appended claims. The improved apparatus itself, however, both as to its construction and the mode of operating the same, together with additional features and advantages thereof, will be best understood upon perusal of the following detailed description of a specific embodiment with reference to the accompanying drawings, in which:

FIG. 1 is a transverse vertical section through a slide viewer which embodies my invention;

FIG. 2 is a top plan view of the magazine transporting mechanism, with the selector means shown in a position for forward operation;

FIG. 3 is a similar top plan view and illustrates the selector means in a neutral position;

FIG. 4 is a vertical section as seen in the direction of arrows from the line IV—IV of FIG. 3;

FIG. 5 is a vertical section as seen in the direction of arrows from the line V—V of FIG. 4; and FIG. 6 is a top plan view of the magazine transporting mechanism, with the selector means shown in a position for operation in reverse.

FIG. 1 shows a semiautomatic slide viewer which comprises a housing including a base plate or main support 1 provided with an integral channel 1a for a commercially available slide magazine 2. The channel 1a extends in parallelism with the optical axis of the slide viewer, namely, at right angles to the plane of FIG. 1, and comprises a customary lifter 1b resembling a wedge which extends through the open underside of the magazine 2 to lift successive slides 3 from a lower level to an upper level. A raised slide 3 is shown in FIG. 1 by phantom lines, as at 3'. In such raised position of the slide, the lower edge of its mount is in registry with a horizontal rail or track 4 supported by the base plate 1. This base plate further carries a detachable cover 5 which supports a horizontal guide rod 6 for a reciprocable shifter 9. The guide rod 6 is held against axial movement by split rings 7 and 8 which abut against the outer sides of the cover 5. The shifter 9 has a downwardly extending slide transporting arm 9a which can engage the left-hand edge face of the raised slide prior to shifting of such slide to the solid-line position 3 in which the lower edge face of the slide mount rests on the rail 4. The optical system and the lamp of the slide viewer are not shown in the drawings because they form no part of the present invention. It suffices to say that the image on the slide 3 can be viewed through the optical system from the front side of the slide viewer when the lamp is turned on behind the mount. If the invention is embodied in a slide projector, the lamp behind the slide 3 will project the image onto a screen.

The shifter 9 is coupled with a slide positioner or clamper 10 which is provided with an elongated horizontal slot 10a receiving the stems of two rivets 11 and 12 affixed to the shifter. The distance between the rivets 11, 12 is somewhat less than the length of the slot 10a so that the shifter 9 can be moved with reference to the positioner 10 against the opposition of a torsion spring 13. This spring is mounted on the shifter 9 and bears against a retainer pin 13a on the positioner 10 to urge the latter in a direction to the left, as viewed in FIG. 1, whereby the rivet 12 enters or approaches the right-hand end of the slot 10a. The purpose of the spring 13 is to bias the positioner 10 against the right-hand edge face of the mount on the slide 3 and to thereby maintain the left-hand edge face of the mount in abutment with the arm 9a of the shifter. In this way, the slide 3 is maintained in a position of exact registry with the optical system.

The positioner 10 has a downwardly extending projection 10b adapted to cooperate with a stop shoulder 1c on the base plate 1. The shoulder 1c arrests the positioner 10 but the shifter 9 is free to move further to the left so that its arm 9a can assume the phantom-line position 9a' to the left of the row of slides in the magazine 2. Due to such relative movability of the positioner 10 and shifter 9, the slide 3 can be returned to the position 3' and is then released by the positioner to allow for stepwise advance of the magazine 2.

The shifter 9 is reciprocable along the guide rod 6 by means of a push-pull slide changer 14 having a handle 14a adjacent to the left-hand side of the cover 5. The slide changer 14 is mounted on the base plate 1 and is coupled with the shifter 9 by means of a lever 15. The lever 15 is rockable on a pivot pin 9b carried by the shifter 9 and is biased by a helical spring 16 which tends to maintain its upper arm in abutment with a stop 9c on the shifter. The lower arm of the lever 15 is articulately connected with the slide changer 14 by a pivot pin 15a. When moving in a direction to the left, as viewed in FIG. 1, the slide changer 14 will entrain the shifter 9 until the latter reaches an arresting ring 17 on the guide rod 6. The arm 9a then assumes the phantom-line position 9a'. Further leftward movement of the slide changer 14 is utilized to effect forward or rearward movement of the magazine 2. During such further leftward movement of the slide changer 14, the lever 15 pivots on the pin 9b and expands the spring 16.

The slide magazine 2 is formed with a customary toothed rack 2d which is adjacent to the opening for the lifter 1b and meshes with an indexible pinion 18 mounted on the base plate 1. The pinion 18 is coaxially secured to an indexing wheel 19 having an annulus of equidistant projections in the form of short cylindrical studs 19a–19g which extend from one end face of the indexing wheel. The annulus of projections 19a–19g has its center on the axis of the pinion 18. The wheel 19 can be turned by a flexible turning member or pawl 20 preferably consisting of sheet metal. The construction of the transporting mechanism for the magazine 2, including the pinion 18, indexing wheel 19, pawl 20 and an editing lever or selector 22 is best shown in FIGS. 2, 3, 4 and 6. The selector 22 is articulately connected to the pawl 20 by a coupling element in the form of a rivet 21 and is tiltable and rockable on a vertical pivot pin 23 fixed to the base plate 1. The free end portion 22a of the editing lever 22 extends from the cover 5 to constitute a convenient handle adjacent to the handle 14a of the slide changer 14. The pawl 20 is biased by a helical spring 25 which tends to rock it in a counterclockwise direction, as viewed in FIG. 2, whereby a cam face 20a of the pawl extends into the path of a motion transmitting post 26 on the slide changer 14. One end of the spring 25 is secured to a fixed retainer 24. The pawl 20 further comprises a relatively long pallet 20b which is constituted by an upwardly inclined flange and can transmit motion to one of the studs 19a–19g or can be bypassed by such studs thus allowing the indexing wheel 19 to remain in its angular position.

The selector 22 is provided with a circular opening 22b which can receive the pointed tip of a lug 27a forming part of a resilient detent member 27 in the form of a leaf spring fixed to the base plate 1, see particularly FIG. 4. A median portion of the leaf spring 27 is located at a level above the slide changer 14 and can descend into a pair of aligned notches or recesses 14b, 14c in the slide changer when the latter is moved to its outer end position. The slide changer 14 is of U-shaped cross-sectional outline (see FIGS. 4 and 5) and each of the notches 14b, 14c is provided in one of its upwardly extending flanges. The tip of the lug 27a of the leaf spring 27 will be located at a level above the opening 22b when the leaf spring is not in registry with the notches 14b, 14c and assumes the phantom-line position 27' of FIG. 4. The upwardly extending surfaces bounding the notches 14b, 14c diverge in a direction toward the upper side of the slide changer 14 so that the leaf spring 27 will more readily find its way into the notches when the opening 22b is in a position of at least partial alignment with the tip of the lug 27a. Furthermore, the spring 27 is a detent, not a lock, so that the inclined surfaces bounding the notches 14b, 14c allow for turning of the selector 22 in response to a relatively small effort. Also, the slide changer 14 can be readily displaced against the opposition of the leaf spring 27, even if the selector 22 remains in the position of FIG. 4 in which the tip of the lug 27a extends into the opening 22b and the leaf spring 27 extends into the notches 14b, 14c. Such displacement of the slide changer 14 against the opposition of the leaf spring 27 will be necessary when the slide magazine 2 is removed from the channel 1a and the slide lever is to be put away.

If the selector 22 is moved to the first position shown in FIG. 2, it engages a first abutment pin 28 which is mounted on the base plate 1. By moving the slide changer 14 in the direction indicated by arrow A, the operator will return a slide 3 from the solid-line position to the phantom-line position 3' of FIG. 1. During such movement, the lower edge face of the slide mount travels along the rail 4 and thereupon along the lifter 1b. The positioner 10 is arrested when the projection 10b engages the stop shoulder 1c and the arm 9a is arrested when the shifter 9 engages the arresting ring 17 of the guide rod 6. In response to further movement of the slide changer 14 in the direction indicated in FIG. 2 by arrow A, the lever 15 rocks on the pivot pin 9b and the motion transmitting post 26 engages the cam face 20a to rock the turning member or pawl 20 in a clockwise direction whereby the spring 25 stores energy and the pallet 20b engages the stud 19c to turn the indexing wheel 19 and pinion 18 in a counterclockwise direction as indicated by the arrow B. A detent spring 29 has a bent-over end portion which ratchets along the pinion 18 and enters the space between two adjoining teeth of the pinion to thereby locate the magazine 2 in a position in which the next slide is in accurate alignment with the arm 9a (in the position 9a') and with the rail 4. Such next slide is held in the raised position 3' because it has been caused to slide along the lifter 1b. The first position of the selector 22 which is shown in FIG. 2 corresponds to a setting of the transporting mechanism for forward movement of the magazine 2. The pallet 20b of the pawl 20 is then engageable with successive studs 19c, 19b, 19a, 19g etc. at one side of the axis of the indexing wheel 19.

The pawl 20 is provided with two upwardly inclined slopes or ears 20c and 20d which are disposed at the opposite sides of the pallet 20b. When the pallet 20b engages the stud 19c and turns the indexing wheel 19 in a counterclockwise direction, the stud 19a slides along the slope 20c and onto the top face of the pawl 20 which is readily flexible because it preferably consists of springy sheet metal or plastic. The slope 20c thus prevents undesirable locking or binding of the pawl with the indexing wheel. Each angular displacement of the indexing wheel 19 by a distance corresponding to the spacing between two adjoining studs corresponds to a displacement of the magazine 2 by a distance equal to that between the central planes of two adjoining slides.

When the slide changer 14 is subsequently returned to the position of FIG. 1, a fresh slide 3 is automatically advanced to the solid-line position and is properly clamped between the arm 9a and positioner 10.

If the operator wishes to shift the magazine 2 with reference to the channel 1a independently of the slide changer 14 and pawl 20, the selector 22 is moved to a third or neutral position shown in FIG. 3. The slide changer 14 is assumed to be located in the outer end position shown in FIGS. 4 and 5 so that the leaf spring 27 snaps into the notches 14b, 14c and the tip of its lug 27a enters the opening 22b. The selector 22 is then preferably deformed or tilted (see FIG. 4) and moves the pawl 20 downwardly and below the level of the studs 19a–19g so that the indexing wheel 19 can be readily rotated by the pinion 18 in response to shifting of the magazine 2 along the channel 1a. The pallet 20b is then located in the interior of the annulus formed by the studs 19a–19g. In order that the leaf spring 27 may snap into the notches 14b, 14c the slide changer 14 must be withdrawn to its outer end position so that the arm 9a assumes the position 9a' and cannot interfere with movement of slides which are accommodated in the magazine 2. All that the operator must do in order to displace the magazine 2 is to push or pull the magazine to overcome the bias of the relatively weak detent spring 29 which merely rides over the teeth of the pinion 18. This enables the operator to select at will that slide which is to be viewed in response to next depression of the slide changer 14, or to replace the magazine with another magazine. The operator will feel when the bent-over free end of the detent spring 29 enters a space between the teeth of the pinion 18 and is thereby informed that a selected slide is in arcuate alignment with the rail 4 and arm 9a.

If the selector 22 is then moved to the second position which is shown in FIG. 6 and in which the selector engages a second abutment pin 30, movement of the slide changer 14 in the direction indicated by arrow A will cause the pallet 20b of the pawl 20 to engage the stud 19g at the other side of the axis of the pinion 18 and to turn the indexing wheel 19 and pinion 18 in a clockwise direction (arrow C) whereby the magazine 2 is moved backwards. The slope 20d is then located in the path of the stud 19c so that the latter can slide onto the pawl 20 without locking.

It is clear that the leaf spring 27 constitutes but one form of detent means for releasably holding the slide changer 14 in the outer end position. Such detent means may comprise a spring-biased ball which snaps into a notch of the slide changer or any other suitable device which holds the slide changer against undesirable movement from third position when the magazine 2 is to be shifted independently of the pawl 20.

The cam face 20a will be held in abutment with the motion transmitting post 26 at least when the slide changer 14 approaches its outer end position. The distance covered by the pawl 20 for turning the indexing wheel 19 by a step is but a small fraction of the overall distance covered by the slide changer 14 between the position of FIG. 1 and the fully extended position.

The one-piece pallet 20b could be replaced by two separate pallets one of which would turn the wheel 19 is a clockwise direction (arrow C) and the other of which would turn the wheel 19 in a counterclockwise direction (arrow B). However, the one-piece pallet 20b has been found to be much sturdier, especially when the pawl 20 consists of flexible sheet metal stock.

If the magazine is a circular slide tray, it is rotatable on the plate 1 and has a ring gear which meshes with the pinion 18.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a slide manipulating apparatus for use with slide magazines of the type having a set of teeth, a support for the magazine; a pinion rotatably mounted in said support and arranged to mesh with the teeth of a magazine which is placed on said support; an indexing wheel for said pinion, said wheel being coaxial with said pinion and having an annulus of equidistant projections and an end face from which said projections extend, said annulus of projections having its center on the axis of said wheel; a turning member displaceable between first, second and third positions and having pallet means engageable with said projections only in said first and second positions thereof, said pallet means being located in registry with a projection at one side of said axis in the first position of said turning member and in registry with a projection at the other side of said axis in the second position of said turning member; selector means for moving said turning member between said positions; and motion transmitting means for imparting to said turning member recurrent movements which, in said first and second positions thereof, are transmitted to successive projections to thereby turn said indexing wheel through angles of predetermined magnitude whereby the pinion moves the magazine in stepwise fashion, said pinion and said indexing wheel being rotatable in response to manual displacement of the magazine with reference to said support when the turning member assumes said third position and said motion transmitting means being arranged to move said pallet means against the registering projection whereby the pallet means turns the indexing wheel in a clockwise direction in the first position of said turning member and in a counterclockwise direction in the second position of said turning member, said pallet means being located within the annulus of projections when the turning member is moved to said third position.

2. In a slide manipulating apparatus for use with slide magazines of the type having a set of teeth, a support for the magazine; a pinion rotatably mounted in said support and arranged to mesh with the teeth of a magazine which is placed on said support; an indexing wheel for said pinion, said wheel being coaxial with said pinion and having an annulus of equidistant projections and an end face from which said projections extend, said annulus of projections having its center on the axis of said wheel; a turning member displaceable between first, second and third positions and having pallet means engageable with said projections only in said first and second positions thereof, said pallet means being located in registry with a projection at one side of said axis in the first position of said turning member and in registry with a projection at the other side of said axis in the second position of said turning member, said turning member being provided with two slopes each engageable by one of said projections when another projection receives motion from said pallet means; selector means for moving said turning member between said positions; and motion transmitting means for imparting to said turning member recurrent movements which, in said first and second positions thereof, are transmitted to successive projections to thereby turn said indexing wheel through angles of predetermined magnitude whereby the pinion moves the magazine in stepwise fashion, said pinion and said indexing wheel being rotatable in response to manual displacement of the magazine with reference to said support when the turning member assumes said third position and said motion transmitting means being arranged to move said pallet means against the registering projection whereby the pallet means turns the indexing wheel in a clockwise direction in the first position of said turning member and in a counterclockwise direction in the second position of said turning member.

3. A structure as set forth in claim 2, further comprising detent means for releasably holding said selector means in a position corresponding to the third position of said turning member.

4. A structure as set forth in claim 2, wherein said selector means is mounted on said support and is movable by hand between first, second and third positions which respectively correspond to the first, second and third positions of said turning member.

5. A structure as set forth in claim 2, wherein said turning means is a pawl consisting of flexible sheet stock.

6. A structure as set forth in claim 2, further comprising a push-pull slide changer arranged to move slides from and back into a magazine on said support, said motion transmitting means being provided on said slide changer and said turning member having a cam face which is engaged by said motion transmitting means in response to movement of said slide changer in one direction.

7. A structure as set forth in claim 6, wherein said slide changer is movable to and from an end position and wherein said motion transmitting means is arranged to engage said cam face and to move said turning member when the slide changer approaches said end position.

8. A structure as set forth in claim 3, wherein said slide changer is movable to and from an end position and wherein said detent means is automatically disengaged from said selector means in response to movement of the slide changer from said end position.

9. A structure as set forth in claim 2, wherein said selector means comprises a manually turnable lever one end of which is articulately coupled to said turning member.

10. A structure as set forth in claim 2, further comprising means for biasing said turning member against said motion transmitting means.

11. A structure as set forth in claim 2, further comprising yieldable detent means for said pinion, said detent means having a portion extendable into the spaces between the teeth of said pinion.

References Cited
UNITED STATES PATENTS

| | | | |
|---|---|---|---|
| 2,590,492 | 3/1952 | Bennett et al. | 40—79 X |
| 3,023,669 | 3/1962 | Hall | 40—79 X |
| 3,165,971 | 1/1965 | Zillmer et al. | 40—79 X |

EUGENE R. CAPOZIO, Primary Examiner

RICHARD CARTER, Assistant Examiner

U.S. Cl. X.R.

40—79